United States Patent
Hernacki et al.

(10) Patent No.: US 7,836,499 B1
(45) Date of Patent: Nov. 16, 2010

(54) DYNAMIC DEPTH INSPECTION

(75) Inventors: Brian Hernacki, San Carlos, CA (US);
Jeremy Bennett, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 1289 days.

(21) Appl. No.: 10/994,171

(22) Filed: Nov. 18, 2004

(51) Int. Cl.
*G06F 11/00* (2006.01)
(52) U.S. Cl. .............................. 726/22; 726/23; 726/24; 726/25; 713/188
(58) Field of Classification Search .............. 726/22–25; 713/188; 709/224, 226
See application file for complete search history.

(56) References Cited

U.S. PATENT DOCUMENTS

| | | | | |
|---|---|---|---|---|
| 6,301,668 | B1 * | 10/2001 | Gleichauf et al. | ............. 726/25 |
| 2002/0143850 | A1 * | 10/2002 | Caronni et al. | ............. 709/201 |
| 2003/0145228 | A1 * | 7/2003 | Suuronen et al. | ............ 713/201 |

* cited by examiner

*Primary Examiner*—Kimyen Vu
*Assistant Examiner*—Baotran N To
(74) *Attorney, Agent, or Firm*—Hunton & Williams LLP

(57) ABSTRACT

Detecting network threats through dynamic depth inspection is disclosed. A mandatory threat detection procedure is performed on data received via a network. It is determined probabilistically whether to perform an optional threat detection procedure on at least a portion of the data. The optional threat detection procedure is then performed if it is determined that it should be performed.

17 Claims, 10 Drawing Sheets

DYNAMIC DEPTH INSPECTION

FIELD OF THE INVENTION

The present invention relates generally to network security. More specifically, providing network security via statistical dynamic depth inspection of data is disclosed.

BACKGROUND OF THE INVENTION

Network security is currently enhanced in part by systems such as a network Intrusion Detection System (IDS), network Intrusion Prevention System (IPS), or firewall. However, many of these systems are deployed in high-bandwidth environments in which it is infeasible for the systems to monitor fully all of the network traffic received on a high-bandwidth link. Specifically, hardware limitations prevent these systems from monitoring all of the bytes in passing network traffic.

To address this problem, current systems typically rely on "traffic discard," in which data is partially decoded and evaluated for "match potential." It is then either scanned against known signatures or simply discarded without being scanned. In using traffic discard, current systems reduce the amount of data that they actually scan into a range that matches their processing capability. Discarded data often includes HTTP and SMTP content, which collectively make up a majority of the data crossing many typical high-bandwidth network environments. By not scanning HTTP and SMTP content, the load on these systems is significantly reduced. However, a significant risk is also created because any threat located in the content portion of the transaction (e.g., the HTTP response body instead of the HTTP response header) will be ignored by the threat detection system. The existing divide between bandwidth and computational power continues to expand, and will make the problem increasingly severe over time.

What is needed is a means for providing at least a degree of security with respect to portions of network traffic that would otherwise be excluded from analysis, e.g., due to hardware or other limitations.

BRIEF DESCRIPTION OF THE DRAWINGS

Various embodiments of the invention are disclosed in the following detailed description and the accompanying drawings.

DETAILED DESCRIPTION

Figure 1A:
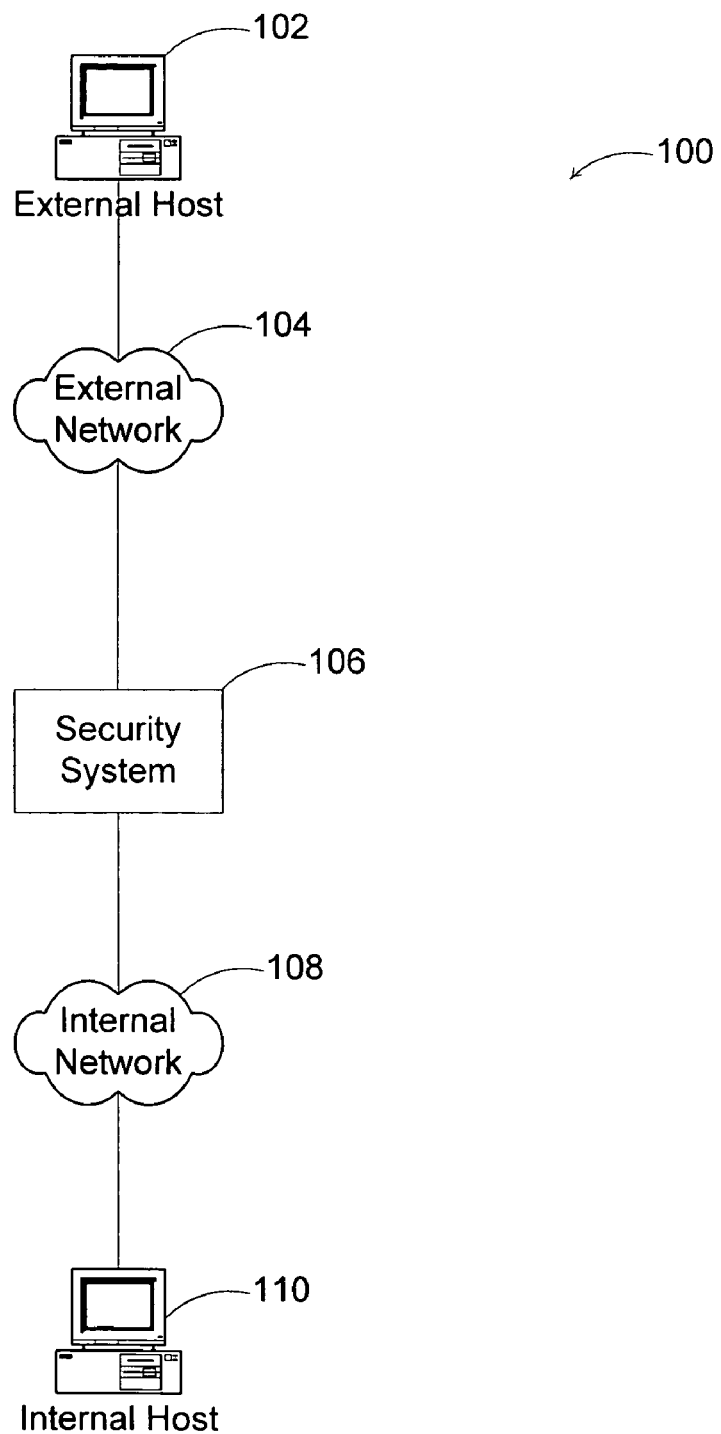
FIG. 1A is a diagram illustrating an example of a network environment in which security is provided.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing network security via statistical dynamic depth inspection of data is disclosed. When a system performs threat detection on data, overhead and other constraints prevent it from dedicating 100% of its processing power to threat detection. The resources available for threat detection ($C_{TD}$) are the total computational power of the system ($C_{Total}$), less the computational power required by non-threat detection processes or services ($C_{NTD}$) and can be written as: $C_{TD}=C_{Total}-C_{NTD}$. However, only a portion of $C_{TD}$ is actually used to detect threats. Threat detection resources are allocated between threat detection related overhead ($C_{TDOverhead}$) which includes the costs of such tasks as picking up data, administration (e.g., reporting and alerts), and screen functions; threat detection related decoding ($C_{TDDecode}$) which is the cost of decoding data (e.g., Ethernet, LP, TCP, SMTP) so that threat detection analysis can be performed on the decoded data; and the actual inspection and threat detection analysis ($C_{TDInspection}$) which is the cost of performing byte comparisons, other signature matching, etc. Thus, the computational resources available for threat detection are given by the following equation:

$$C_{TD}=C_{TDOverhead}+C_{TDDecode}+C_{TDInspection} \qquad (1)$$

Rewriting equation (1) and substituting $C_{total} - C_{NTD}$ for $C_{TD}$ yields the following equation for the computational resources available to inspect decoded data for threats:

$$C_{TDInspection} = C_{Total} - C_{NTD} - (C_{TDOverhead} + C_{TDDecode}). \quad (2)$$

Hardware limitations limit the ability of a threat detection system to perform full inspection on all of the data which flows through a network link the system is installed to protect. This is especially problematic in high-bandwidth environments. In such environments, the total resources available for threat detection processing ($C_{TD}$) may not be sufficient to enable all the traffic on a high-bandwidth link to be inspected. As noted above, this limitation typically has been addressed by inspecting fully only a portion of the data passing on the link, with the result that certain types of data generally is not inspected and/or certain types of threat detection processing are never performed.

Providing network security via statistical dynamic depth inspection of data is disclosed. In one embodiment at least one threat detection procedure is performed on all data to which the mandatory threat detection procedure is applicable. It is determined probabilistically whether an optional threat detection procedure will be performed on a portion of the data, and the optional threat detection procedure is performed on those portions of data for which it is determined that it should be performed. In this way, a threat detection procedure that formerly might never have been performed, e.g., due to processing capacity constraints, is performed at least some of the time.

The term "mandatory threat detection procedure" is used herein to refer to a threat detection procedure that is always performed on all received data to which it is applicable. A mandatory threat detection procedure, for example, may be performed on high-risk data or for high-risk threats. The term, "mandatory threat detection procedure" does not necessarily signify that a procedure is mandated by a regulatory board. In one embodiment, at least one threat detection procedure is performed on only a subset of the received traffic to which the threat detection procedure applies. The term "optional threat detection procedure" is used herein to refer to such a threat detection procedure. In one embodiment, it is determined probabilistically whether optional threat detection processing on data should be performed in addition to mandatory threat detection processing. In another embodiment, a subset of threat detection procedures is probabilistically determined from a plurality of threat detection procedures. In some embodiments, whether and which optional threat detection processing should be performed can be determined dynamically. As described more fully below, in some embodiments, the decision to perform optional threat detection processing is based at least in part on factors such as the available resources of the system, the type of data to be processed, and whether any signatures or rules exist that could be applied to the data.

FIG. 1A is a diagram illustrating an example of a network environment in which security is provided. Network environment 100 includes an external host 102 configured to send data to internal host 110 via an external network 104. In the example shown in FIG. 1A, data sent by external host 102 to internal host 110 via external network 104 would be processed by security system 106 and, if appropriate, delivered via internal network 108 to internal host 110. In one embodiment, security system 106 is configured to detect a security threat in data sent by external host 102 to internal host 110, such as may be present if external host 102 were compromised or otherwise posed a security risk to internal host 110. In various embodiments, security system 106 includes a firewall, IDS, or other appropriate type of device or application for security management, intrusion detection, network security, etc., or any combination or plurality of such devices or applications. In one embodiment, security system 106 includes a firewall. In one embodiment, security system 106 includes an IDS or other security device inline. In one embodiment, security system 106 includes an IDS or another security device configured to receive a copy of network traffic.

Figure 1B:
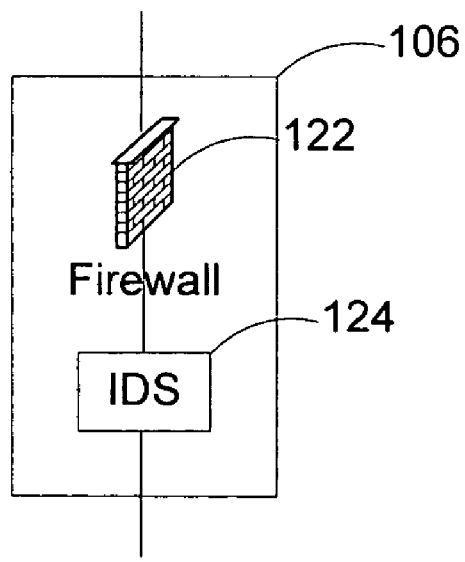
FIG. 1B is a diagram illustrating a security system as implemented in one embodiment.

FIG. 1B is a diagram illustrating security system 106 as implemented in one embodiment. In the example shown, security system 106 includes two inline security devices. Specifically, a firewall 122 and an IDS 124 are shown. In another embodiment, IDS 124 is an IPS.

Figure 1C:
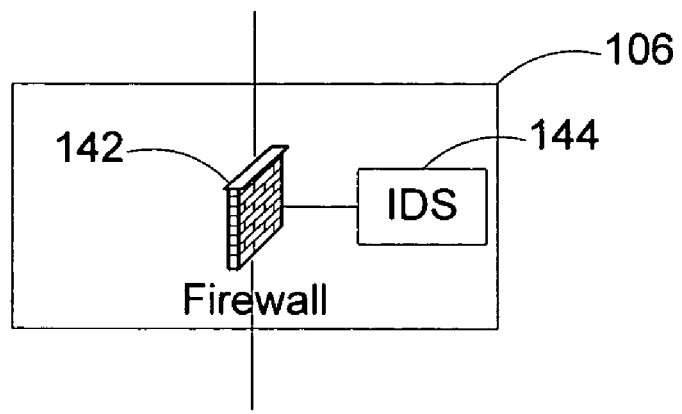
FIG. 1C is a diagram illustrating a security system as implemented in one embodiment.

FIG. 1C is a diagram illustrating security system 106 as implemented in one embodiment. In the example shown, security system 106 includes a firewall 142 and an IDS 144 configured to receive a copy of network traffic sent to internal hosts on the internal network 108.

Figure 2:
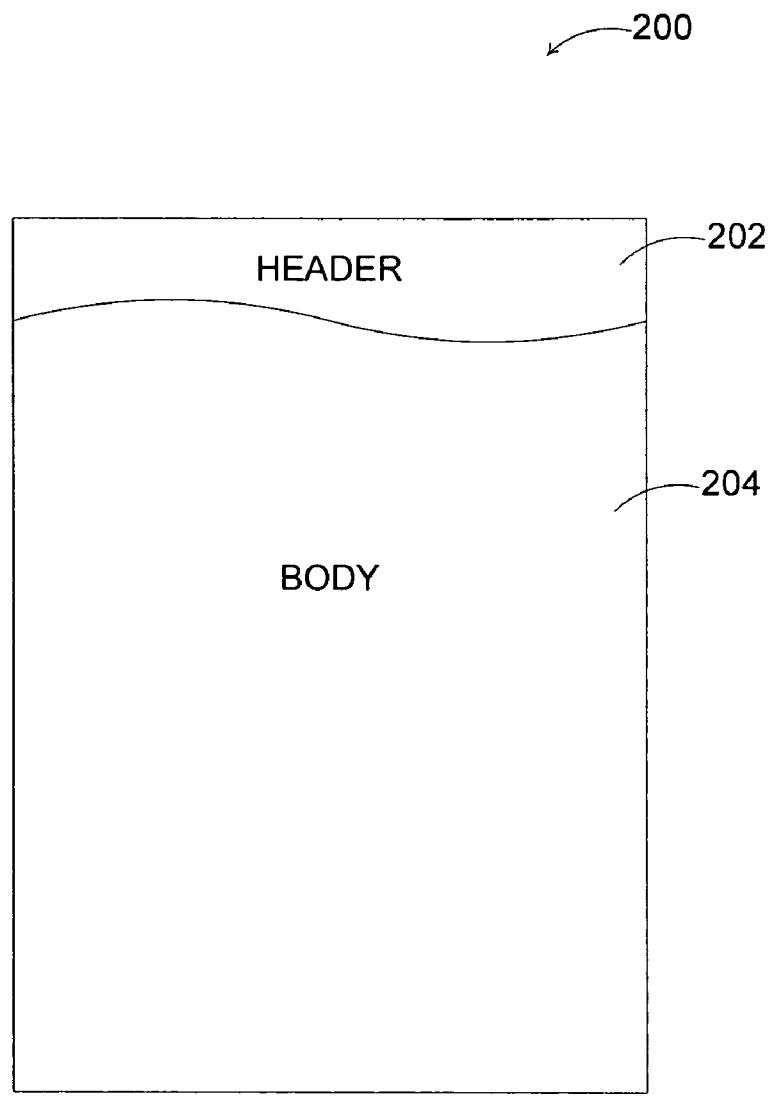
FIG. 2 is a diagram illustrating data that would typically be sent, for example, by an external host to an internal host.

FIG. 2 is a diagram illustrating data 200 that would typically be sent, for example, by external host 102 to internal host 110. In this example, data 200 is an HTTP response encapsulated in TCP that includes a header 202 and a body 204. In some embodiments, other protocols may be employed as appropriate, such as SMTP or FTP. In some embodiments, data 200 is a datagram, stream, or frame, depending on how the data is encapsulated. In the past, in some cases inspection of data 200 may have been limited to the header 202, with the body 204 not being inspected and/or being subjected to limited inspection, e.g., to avoid (or at least limit) using processing capacity to decode and inspect the body 204, depending on the particular implementation and configuration. Using the techniques described herein, in one embodiment the body 204 is decoded and inspected, at least partially, at least some of the time, as described more fully below.

Figure 3:
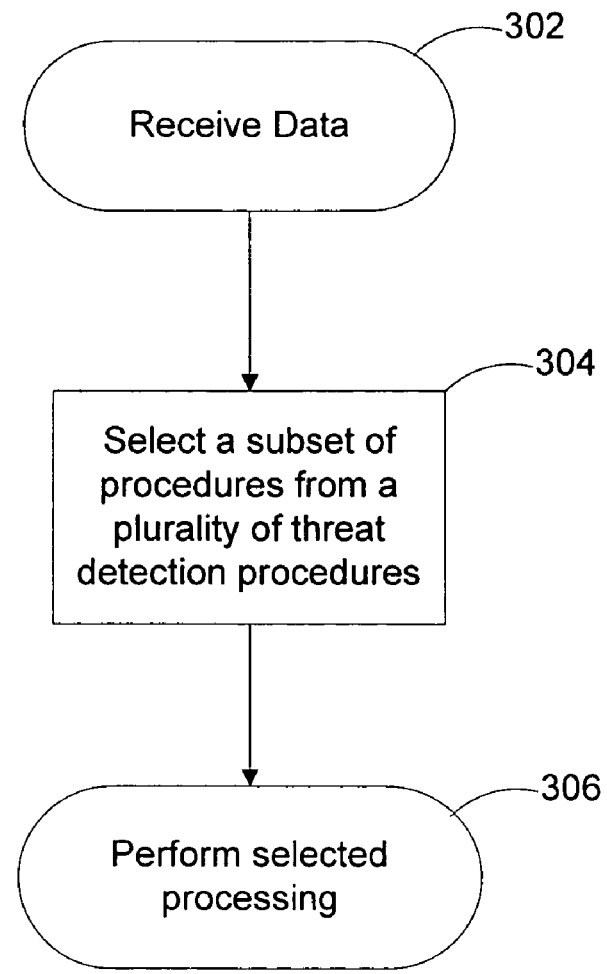
FIG. 3 is a flow diagram illustrating a process used in an embodiment to monitor network traffic for threats.

FIG. 3 is a flow diagram illustrating a process used in an embodiment to monitor network traffic for threats. In one embodiment, FIG. 3 processing is implemented in a security system such as security system 106. In some embodiments, FIG. 3 processing is implemented on an IDS, such as IDS 124 or IDS 144. The process begins at 302 when data, such as data 200, is received, for example, from an external host 102. In one example the data is received inline, such as depicted in FIG. 1B. In another example, the data is copied, such as in FIG. 1C. At 304, a subset of procedures to perform on the received data is selected from a plurality of threat detection procedures. Depending on the embodiment, this determination can be made statically and/or dynamically and can depend on a variety of factors as discussed later in conjunction with FIGS. 5 and 6, respectively. The selected threat detection procedures are performed on the data at 306.

Figure 4:
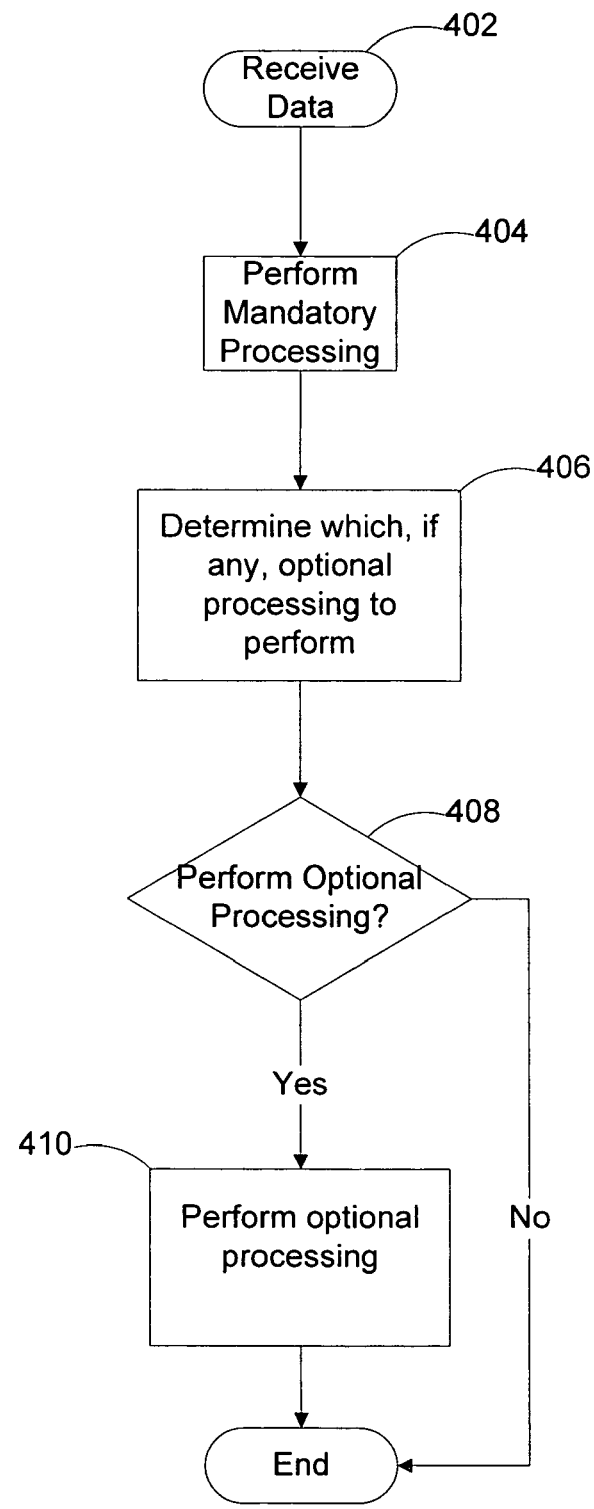
FIG. 4 is a flow diagram illustrating a process used in an embodiment to monitor network traffic for threats.

FIG. 4 is a flow diagram illustrating a process used in an embodiment to monitor network traffic for threats. In this example, the process begins at 402 when data such as data 200 is received. Mandatory threat detection processing is performed on data 200 at 404. At 406, it is determined which, if any, optional threat detection processing should be performed. Depending on the embodiment, this can be accomplished statically and/or dynamically based on a variety of factors as more fully depicted in FIGS. 5A-7. If it is determined at 408 that at least one optional threat detection procedure was selected in 406 to be performed, the optional threat detection processing selected at 406 is performed on the data at 410. If no optional threat detection processing is to be performed, the process ends.

Figure 5A:
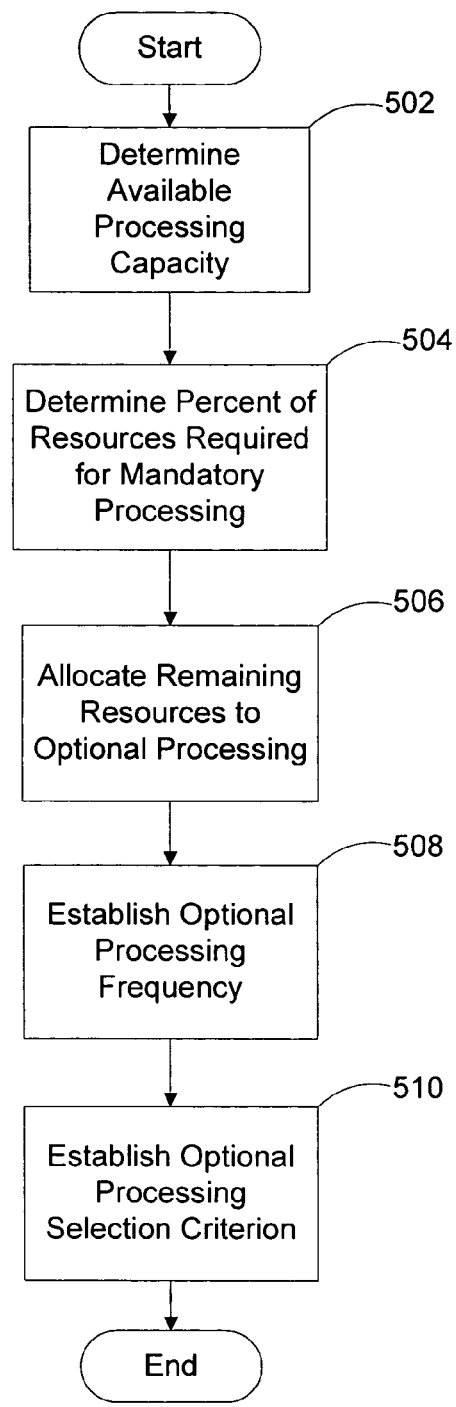
FIG. 5A is a flow diagram illustrating a process used in an embodiment to determine statically the criteria used to determine whether optional threat detection processing should be performed on a particular set of data.

FIG. 5A is a flow diagram illustrating a process used in an embodiment to determine statically the criteria used to determine whether optional threat detection processing should be performed on a particular set of data. The available threat detection processing capacity, e.g., of security system 106, is determined at 502. This result corresponds with $C_{TD}$ described above and is illustrated in FIG. 5B as threat detection capacity 522. It will be readily apparent to one skilled in the art that this determination may be made different ways employing methods appropriate to the architecture of the security system used. At 504, the percentage of $C_{TD}$ required for mandatory threat detection processing (if applicable) is determined. It will be readily understood that this determination can be based on a wide variety of factors, such as the number and complexity of mandatory rules selected, and that implementation will vary depending on the platform used. Allocation of the remaining capacity to optional threat detection processing occurs at 506. In one embodiment, in 506 a portion of the threat detection processing capacity that remains after reducing the total processing capacity available for threat detection processing by the amount of resources required for mandatory processing, if any, as determined at 504 is allocated to each optional threat detection procedure to be performed at least sometimes. For example, in an embodiment in which there are two optional threat detection procedures, the remaining capacity would be allocated between them in 506. At 508, the frequency with which each optional threat detection procedure will occur is determined. For example, it may be decided in 504 that mandatory threat detection processing will consume 90% of the processing capacity available to perform threat detection processing, and in 506 that the remaining 10% will be allocated evenly between a first optional threat detection procedure and a second optional threat detection procedure (i.e., 5% each). In 508, it may be determined, e.g., that the allocated resources are sufficient (based on such factors on the expected volume of traffic of the type to which the procedure applies, the resources consumed to perform the overhead, decoding, and inspection tasks associated with the optional procedure, etc.) to enable the first optional threat detection procedure to be performed on 1 in 10 of the data sets (e.g., packets, transactions, etc.) to which the first optional threat detection procedure applies and a second optional threat detection procedure to be performed on 1 in 4 of the data sets to which the second optional threat detection procedure applies. In one embodiment, the frequency of optional threat detection processing is pre-set, such as at a factory. In one embodiment, the frequency of optional threat detection processing is determined by an administrator. At 510, for each optional threat detection procedure to be performed at least some of the time, a selection criterion to be used to determine whether the optional threat detection processing is to be performed with respect to a particular set of data is established. For example, in one embodiment if it is determined a particular threat detection procedure is to be performed on 1 in 10 of the received sets of data to which the procedure applies (e.g., a full scan of SMTP content is to be performed on 1 in 10 SMTP messages received), the selection criterion (or criteria) might include generating randomly for each received set of data to which the option processing applies a number between one and ten and performing the optional processing on a particular set if number generated randomly for it is "1". This process is described more fully in conjunction with FIG. 7. In one embodiment, the selection criterion for optional threat detection processing is pre-set, such as at a factory. In one embodiment, the selection criterion is determined by an administrator.

Figure 5B:
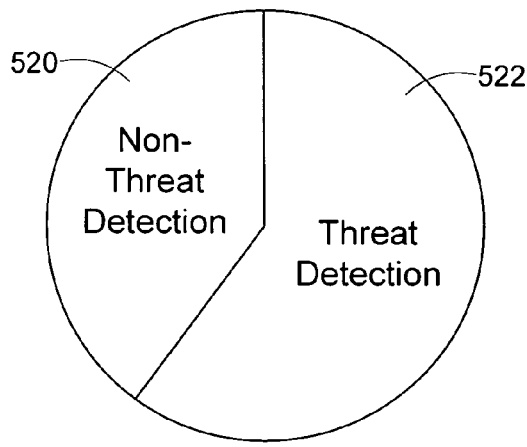
FIG. 5B is a diagram illustrating an allocation of resources between non-threat detection and threat detection.

FIG. 5B is a diagram illustrating an allocation of resources (e.g., total processing capacity $C_{total}$) between non-threat detection and threat detection. In this example, percent non-threat detection 520 corresponds with $C_{NTD}$ and percent threat detection 522 corresponds with $C_{TD}$. In one embodiment, the processing capacity $C_{TD}$ available to perform threat detection processing is determined at 502 of FIG. 5A.

Figure 5C:
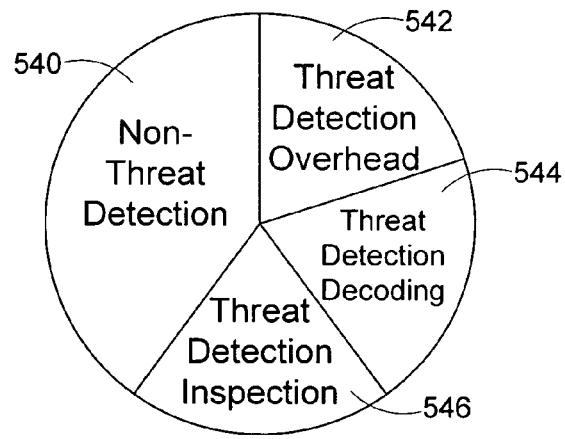
FIG. 5C is a diagram illustrating an allocation of resources between non-threat detection and threat detection, including allocation within the latter category to particular aspects of threat detection processing.

FIG. 5C is a diagram illustrating an allocation of resources between non-threat detection and threat detection, including allocation within the latter category to particular aspects of threat detection processing. In this example, $C_{TD}$ is allocated among threat detection overhead ($C_{TDOverhead}$) 542, threat detection decoding ($C_{TDDecode}$)544, and threat detection inspection ($C_{TDInspection}$) 546. FIG. 5C represents a configuration in which no optional threat detection processing is performed.

Figure 5D:
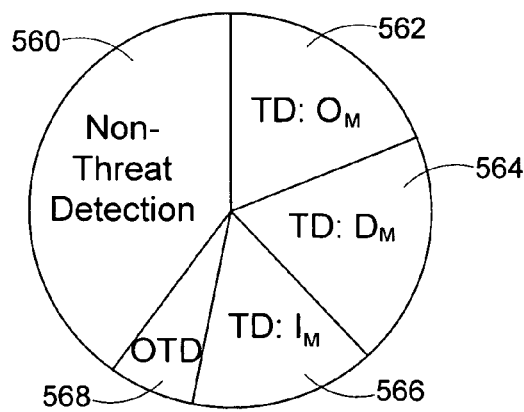
FIG. 5D is a diagram illustrating an allocation of resources between non-threat detection and threat detection, including an allocation of resources to optional threat detection processing.

FIG. 5D is a diagram illustrating an allocation of resources between non-threat detection and threat detection, including an allocation of resources to optional threat detection processing. In this example, the majority of $C_{TD}$ is allocated to mandatory threat detection (e.g., at 504 of FIG. 5A), which is divided among the overhead associated with mandatory threat detection ($O_M$) 562, the decoding required to perform mandatory threat detection ($D_M$) 564, and mandatory inspection ($I_M$) 566. The remainder of $C_{TD}$ is allocated to optional threat detection (OTD) 568 (e.g., at 506 of FIG. 5A) which in this example includes the overhead, decode, and inspection requirements for optional processing.

Figure 6:
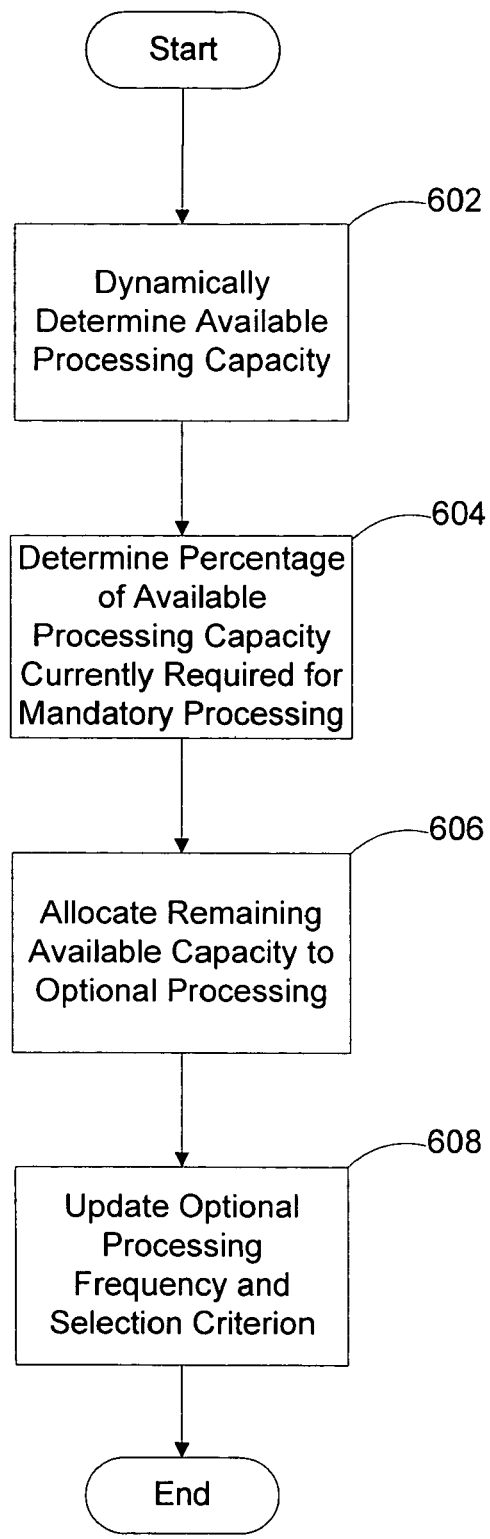
FIG. 6 is a flow diagram illustrating a process used in an embodiment to determine dynamically the criteria used to determine whether optional threat detection processing should be performed on a particular set of data.

FIG. 6 is a flow diagram illustrating a process used in an embodiment to determine dynamically the criteria used to determine whether optional threat detection processing should be performed on a particular set of data. The processing capacity available to perform threat detection processing is determined dynamically at 602. It will be readily apparent to one skilled in the art that this determination may be made different ways employing methods appropriate to the architecture of the security system used. At 604, the percentage of the processing capacity available for threat detection processing that is required for mandatory threat detection processing is dynamically determined. It will be readily understood that this determination can be based on a wide variety of factors, such as the number and complexity of mandatory rules selected, the type and quantity of traffic that is being received and/or processed, etc. and that implementation will vary depending on the platform used. Dynamic allocation of the remaining capacity to optional threat detection processing occurs at 606. At 608, the optional processing frequency and selection criterion are dynamically established and/or updated, as applicable and/or required. The frequency with which the procedure depicted in FIG. 6 is performed may vary dynamically depending on such factors as the architecture of the security system (e.g., what resources are available right now to perform optional threat detection processing), the amount of data being processed by the security system at a particular time (e.g., historical load patterns based on time of day, day of week, etc.; actual observed load; etc.), external inputs (e.g., local and/or global network threat conditions) and the preferences of an administrator of security system. In one embodiment, the process of FIG. 6 is performed each time a security system on which the process of FIG. 6 is implemented is powered on. In one embodiment, the process of FIG. 6 is performed at a prescribed interval, e.g., every 24 hours. In one embodiment, the process of FIG. 6 is performed whenever the load of a security system on which the process is implemented reaches a certain point, for example a high load, or a low load. In some examples, the optional processing frequency and selection criterion determined at 608 match the values existing for them prior to the most recent iteration of the dynamic process shown in FIG. 6 and are not updated, e.g., where dynamic conditions are such that no change is indicated.

Figure 7:
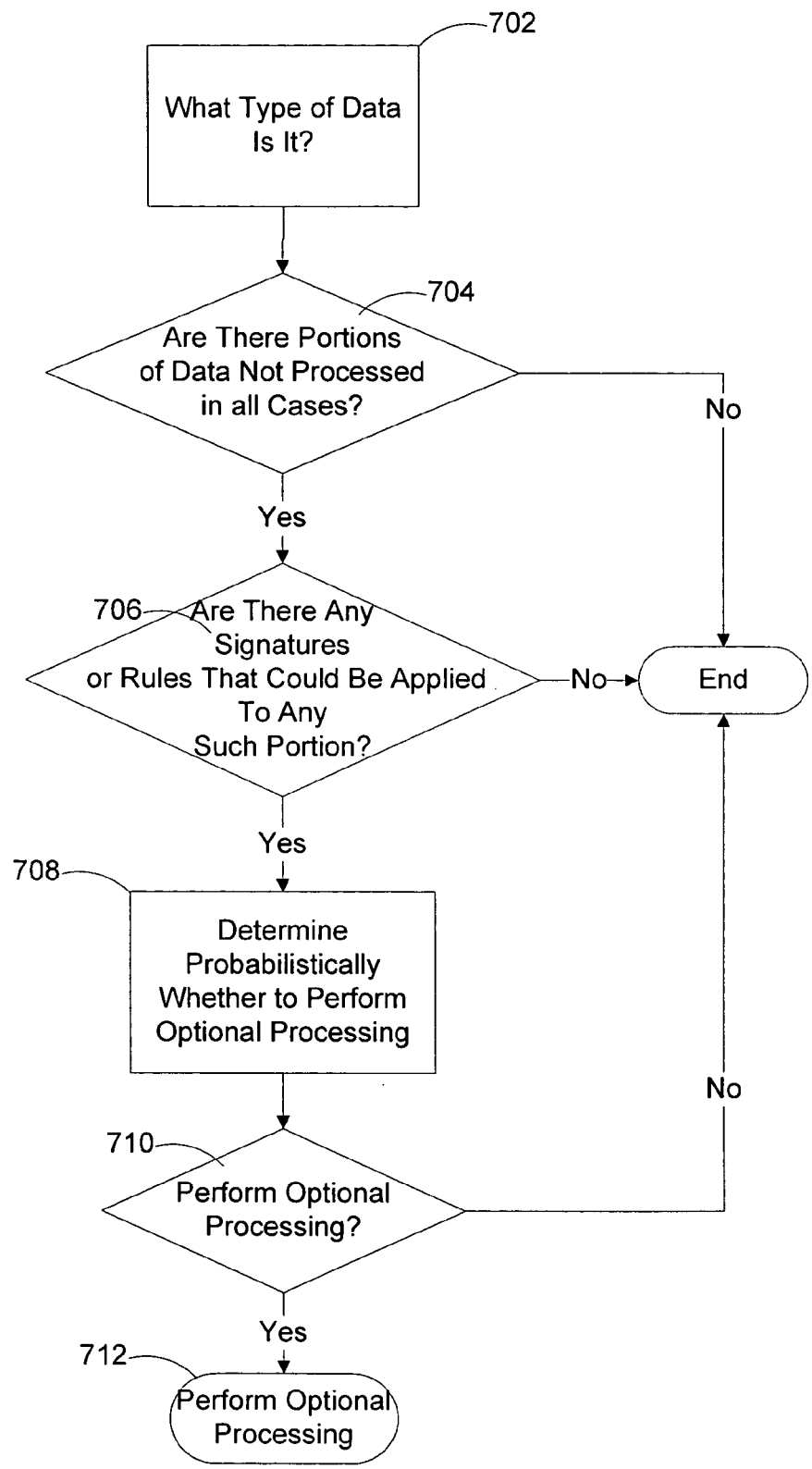
FIG. 7 is a flow diagram illustrating a process used in an embodiment to determine whether optional threat detection processing should be performed on a particular set of data.

FIG. 7 is a flow diagram illustrating a process used in an embodiment to determine whether optional threat detection processing should be performed on a particular set of data. In one embodiment, the process of FIG. 7 is used to implement 304 and 306 of FIG. 3. In one embodiment, the process of FIG. 7 is used to implement 406-410 of FIG. 4. At 702, it is determined what type of data is being processed. For example, if a particular set of data is an HTTP response, it could contain a header and a body, as described above. If the data is part of an SMTP session, it could contain an email header and a body. At 704, it is determined whether the set of data includes a portion that is not processed in all cases (e.g., to which no mandatory processing applies, in an embodiment in which mandatory processing is performed on some portions, such as a header portion, but not others, such as a body or other content portion). If the set of data does not include a portion that is not processed in all cases, the process ends. If the set of data includes such a portion that is not processed in all cases, it is determined at 706 if there exist any threat signatures or other threat detection procedures that could be applied to a portion of the set of data that is not processed in all cases, i.e., whether any optional threat detection processing applies to the portion. For example, if the portion not processed in all cases is the body portion of an HTTP response, it is determined at 706 whether there is a known method for detecting threats in HTTP response bodies. In one alternative embodiment, not shown in FIG. 7, there may exist optional threat detection procedures that are performed only in some cases on portions of data on which other, mandatory threat detection processing is always performed. In such an embodiment, 704 and 706 of FIG. 7 may be replaced, at least with respect to such optional processing, with a determination of whether an optional threat detection procedure that applies to the set of data being processed exists. Referring further to the example shown in FIG. 7, if there is no applicable optional threat detection procedure, the process ends. If an applicable option threat detection procedure exists, at 708 it is determined probabilistically with respect to each applicable optional threat detection procedure whether the optional threat detection procedure will be performed with respect to the particular set of data that is being processed. For example, rules could exist that HTTP response headers will be checked 100% of the time, HTTP response bodies will be checked 10% of the time, and email bodies will be checked 50% of the time. In such an embodiment, for each HTTP response that is processed it would be determined probabilistically at 708 whether that particular response will be one of the 10% of such responses to which the optional threat detection procedure for HTTP response bodies is applied. If it is determined at 710 that optional threat detection processing should be performed on the particular set of data being processed, the optional threat detection processing is performed at 712. Otherwise, the process ends.

Using the approaches described herein, threat detection procedures that otherwise might never be performed may instead be performed at least some of the time and/or portions of network data that otherwise might never be subjected to any threat detection processing may at least sometimes be inspected, affording at least a degree of protection (e.g., detection, deterrence, etc.) with respect to threats associated with such processing that would not otherwise ever be performed and/or such portions of network traffic that would otherwise never be inspected.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting network threats comprising:
performing, using at least one processor, a mandatory threat detection procedure on data received via a network;
determining whether to perform at least one of a plurality of optional threat detection procedures on at least a portion of the data, the determination based at least in part on:
resources required for the mandatory threat detection procedure, wherein remaining resources are allocated to the plurality of optional threat detection procedures;
a frequency at which each of the plurality of optional threat detection procedures should be performed; and
a selection criterion that is established to determine probabilistically whether at least one of the plurality of optional threat detection procedures will be performed with respect to a particular set of data; and
performing one or more of the at least one of the plurality of optional threat detection procedures if determined that the one or more of the at least one of the plurality of optional threat detection procedures should be performed.

2. The method recited in claim 1 wherein determining whether to perform at least one of the plurality of optional threat detection procedures is further based at least in part on resources required for mandatory threat detection processing.

3. The method recited in claim 1 further comprising determining what processing resources are available to perform at least one of the plurality of optional threat detection procedures and establishing a selection criterion to be used to determine whether at least one of the plurality of optional threat detection procedures will be applied to a particular set of data and wherein determining whether to perform at least one of the plurality of optional threat detection procedures includes applying the selection criterion to the data.

4. The method recited in claim 3 wherein determining what processing resources are available to perform at least one of the plurality of optional threat detection procedures includes allocating to each of the plurality of optional threat detection procedures a portion of a total amount of resources determined to be available to perform optional threat detection procedures.

5. The method recited in claim 1 wherein a criterion used to determine whether at least one of the plurality of optional threat detection procedures should be performed is determined dynamically.

6. The method recited in claim 1 wherein a criterion used to determine whether at least one of the plurality of optional threat detection procedures should be performed is determined dynamically based at least in part on a dynamic determination of the resources available to perform optional threat detection procedures.

7. The method recited in claim 1 wherein a criterion used to determine whether at least one of the plurality of optional threat detection procedures should be performed is determined dynamically based at least in part on a user input.

8. The method recited in claim 1 wherein a criterion used to determine whether at least one of the plurality of optional threat detection procedures should be performed is determined dynamically based at least in part on a dynamic assessment of network traffic load.

9. The method recited in claim 1 further comprising updating a criterion used to determine whether at least one of the plurality of optional threat detection procedures should be performed.

10. The method recited in claim 1 further comprising updating at a prescribed interval a criterion used to determine whether at least one of the plurality of optional threat detection procedures should be performed.

11. The method recited in claim 1 wherein determining whether at least one of the plurality of optional threat detection procedures should be performed includes determining whether the data includes a portion on which threat detection processing is not performed in all cases.

12. The method recited in claim 1 wherein determining whether at least one of the plurality of optional threat detection procedures should be performed includes whether any signatures or rules exist that could be applied to the data.

13. The method recited in claim 1 wherein determining whether at least one of the plurality of optional threat detection procedures should be performed includes determining whether any signatures or rules exist that could be applied to at least a portion of the data on which threat detection processing is not performed in all cases.

14. The method recited in claim 1 further comprising determining probabilistically for each of the plurality of optional threat detection procedures whether at least one of the plurality of optional threat detection procedures should be performed on a particular set of received data.

15. The method recited in claim 14 wherein determining probabilistically for each of the plurality of optional threat detection procedures whether at least one of the plurality of optional threat detection procedures should be performed on a particular set of received data comprises applying to the set of received data a selection criterion associated with at least one of the plurality of optional threat detection procedures.

16. A system for detecting network threats comprising:
   a communication interface configured to receive data received via a network; and
   a processor configured to:
      perform a mandatory threat detection procedure on the data;
      determining whether to perform at least one of a plurality of optional threat detection procedures on at least a portion of the data, the determination based at least in part on:
         resources required for the mandatory threat detection procedure, wherein remaining resources are allocated to the plurality of optional threat detection procedures;
         a frequency at which each of the plurality of optional threat detection procedures should be performed; and
         a selection criterion that is established to determine probabilistically whether at least one of the plurality of optional threat detection procedures will be performed with respect to a particular set of data; and
      performing one or more of the at least one of the plurality of optional threat detection procedures if determined that the one or more of the at least one of the plurality of optional threat detection procedures should be performed.

17. A computer program product for detecting network threats, the computer program product being embodied in a computer readable storage medium and comprising computer instructions for:
   performing a mandatory threat detection procedure on data received via a network;
   determining whether to perform at least one of a plurality of optional threat detection procedures on at least a portion of the data, the determination based at least in part on:
      resources required for the mandatory threat detection procedure, wherein remaining resources are allocated to the plurality of optional threat detection procedures;
      a frequency at which each of the plurality of optional threat detection procedures should be performed; and
      a selection criterion that is established to determine probabilistically whether at least one of the plurality of optional threat detection procedures will be performed with respect to a particular set of data; and
   performing one or more of the at least one of the plurality of optional threat detection procedures if determined that the one or more of the at least one of the plurality of optional threat detection procedures should be performed.

* * * * *